United States Patent

Robison et al.

[15] 3,676,930
[45] July 18, 1972

[54] HEDGE SHEARS

[72] Inventors: James W. Robison, Belpre, Ohio; Harold L. Eads, Parkersburg, W. Va.

[73] Assignee: O. Ames Division of McDonough Company, Parkersburg, W. Va.

[22] Filed: July 17, 1970

[21] Appl. No.: 55,691

[52] U.S. Cl...............................................30/257, 30/355
[51] Int. Cl..........................................................B26b 13/08
[58] Field of Search....................30/254, 257, 268, 271, 262, 30/355

[56] References Cited

UNITED STATES PATENTS

| 882,781 | 3/1908 | Gerfin | 30/257 |
| 1,251,893 | 1/1918 | Juhl | 30/268 |
| 2,260,884 | 10/1941 | Clinton | 30/254 |
| 2,798,291 | 7/1957 | Smith | 30/271 X |
| 3,262,202 | 7/1966 | Prosky | 30/271 |

FOREIGN PATENTS OR APPLICATIONS

| 3,413 | 2/1897 | Great Britain | 30/355 |
| 338,803 | 11/1930 | Great Britain | 30/355 |

Primary Examiner—Theron E. Condon
Assistant Examiner—J. C. Peters
Attorney—Chittick, Pfund, Birch, Samuels & Gauthier

[57] ABSTRACT

A hedge shears having pivotal shearing and work holding blades. A pivot mounted tensioning spring resiliently biases the blades together for pressured, adherent action from the pivot to the tips. Resilient stop means are rigidly supported on the blades and to compressively engage upon their closing fully together. Work holding notches are formed in the holding blade, shaped or oriented to receive varying size work and firmly hold that in compressing and slicing by the shearing blade.

5 Claims, 6 Drawing Figures

Patented July 18, 1972
3,676,930
2 Sheets-Sheet 1
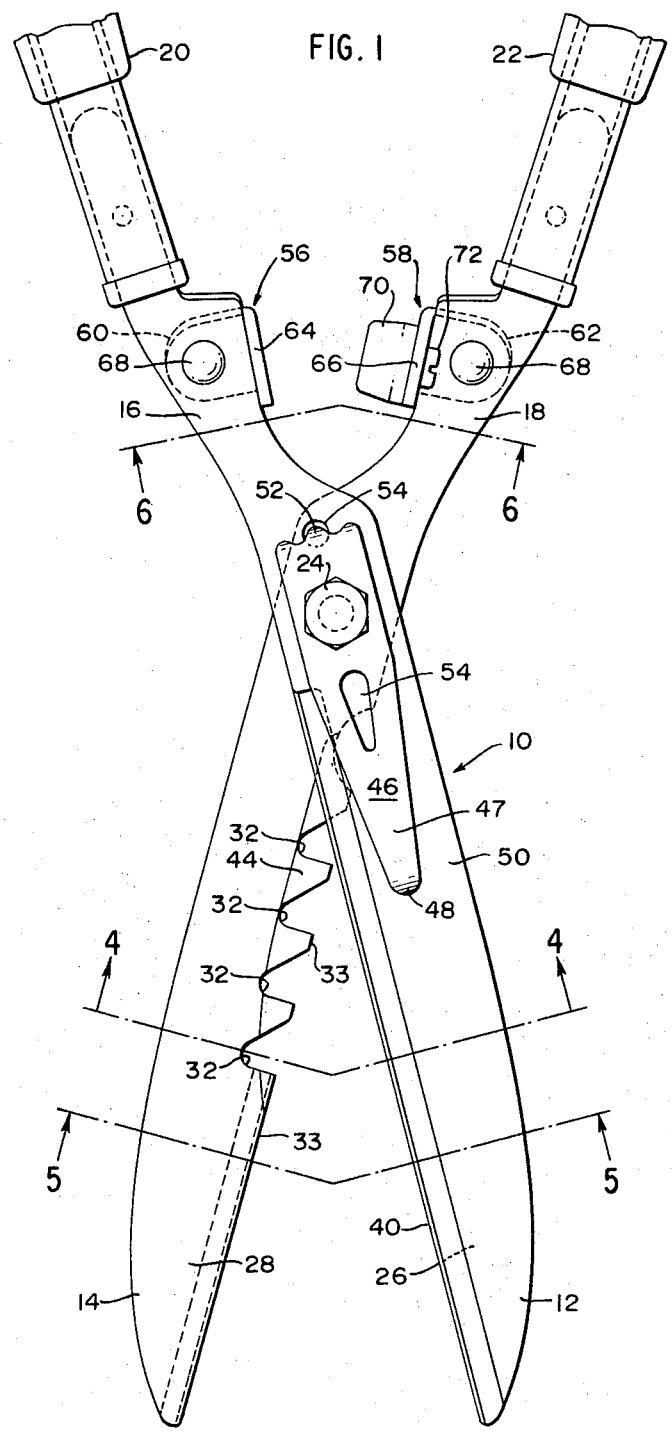
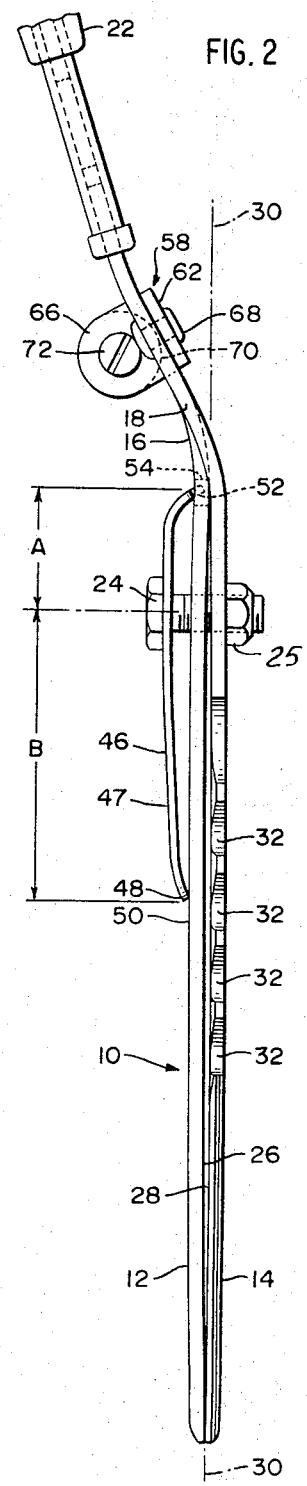
INVENTOR
HAROLD O. EADS
BY Chittick, Pfund, Birch
Samuels, + Gauthier
ATTORNEYS Patented July 18, 1972

INVENTOR
HAROLD O. EADS

BY Chittick, Pfund Birch,
Sandullo, + Gauthier

ATTORNEYS

HEDGE SHEARS

BACKGROUND OF THE INVENTION

This invention relates generally to cutting tools, and is more particularly directed to shears for trimming hedges, tree limbs and the like, and which may be employed as well for edging and trimming grass along the edges of sidewalks, driveways and curbs.

Such hedge shears conventionally comprise two blades pivoted in overlapping relationship for scissors-like engagement of their opposite edges and faces, and with at least one of their said working edges sharpened, to effect a cutting or shearing of the work.

Conventional hedge shears of the straight blade type have as one problem the tendency during cutting for the stems or limbs to slide away from the pivot before the cutting edges penetrate sufficiently to hold the work firmly enough to effect a full cut. Such slippage decreases the mechanical advantage achieved by a pivoted blade construction, the further the work proceeds from the pivot, thus requiring more effort by the operator; work held at the position of its initial contact with the blades being that which would require the least effort.

Heretofore known shears, of which one example is Porzky U.S. Pat. No. 3,196,540, have used a serrated edge, and/or a single half-round notch in the holding blade, or have depended on the cutting edge entering the work, to prevent the slippage.

The mere serrating offers nothing but an opposing notch surface that parallels the cutting edge, and yields a too great risk of slippage even when the cut has commenced. Further, with the non-encompassing serrations, the work tends to be deformed or flattened as the blades close, making the work appreciably harder to cut. Still further, the merely serrated edge will allow the work to twist or rotate toward the shearing plane of the tool, which rotating renders cutting difficult by requiring greater force to sever the work.

The half-round holding notch has limited success in obviating twisting of work having a diameter close to its diameter, but does not effectively hold work of lesser diameter, in the desired position generally perpendicular to the shearing plane of the tool. And if both blades, or the serrations or half-round notches, are sharpened, the tendency of the work to twist is enhanced, and there results mismatched or offset cuts from both sides, producing an uneven severing of the limb.

Moreover, when the shears are provided with only a single holding notch the user is required to align and sever only one limb at a time in that notch. In commercial applications, such as in the trimming of Christmas trees, this procedure has proved to be intolerably slow.

It is thus highly desirable to provide a holding means capable of firmly holding limbs of various diameters in position generally perpendicular to the shearing plane of the tool, and being capable of so holding a plurality of limbs simultaneously that several limbs may be severed in the same cutting stroke.

It is also desirable to provide an effective tension controlling means, to insure proper or firm contact between the blades during the cutting stroke, along their entire length from pivot to tip. There should be firm, cutting contact, but the blades should not be held so tightly that the shear cannot be operated without difficulty, or without excessive wear of the cutting edges.

Various arrangements have been proposed previously, for achieving this desired, effective tension control.

The first and simplest of such prior arrangements is that of making the pivot bolt and nut adjustable. This has proven unsuccessful, by reason of the difficulty, with the same simple pivot means, of retaining both proper tension and proper pivot action.

Another prior arrangement has involved the use of a spring type washer on the pivot bolt. This also has proven unsatisfactory, through the same dependency on merely pivot structure for accomplishing the distinct purposes of holding the blades together and providing the desired blade tension. The washer method simply does not give dependable tension under continuous use.

There has also been proposed the arrangement of Smith U.S. Pat. No. 2,798,291, in which would be employed at the adjustable pivot a tensioning strip larger than, or somewhat elongated as against, the aforementioned washer, but also subject to deficiencies, in particular that the use of it also as a bumper means requires accompanying resort to an anti-rotation, top-blade-notch and tension-strip-detent arrangement. The Smith arrangement, then, has the obvious shortcoming of necessitating a notching of the underlying blade, which in turn has the unwanted effect of weakening that. Further, the Smith strip, even with the retention required by it of a bowed conformation of the shear blades, does not attain the wanted tension control out away from the pivot, this because of its aforementioned doubling as a bumper means, and also because of its short wide stem or stub configuration, and lateral thrusting bearing engagement in a shear blade recess.

Thus, it is desirable to provide a tensioning device that applies pressure away from the pivot; that is not wholly dependent on bolt and nut adjustment; that does not require recessing the blades; and that achieves tension control without substantial dependence on or criticality of tight pivot and/or blade pitch.

Hedge shears have heretofore been provided also with means effective, after the cutting stroke is complete and the blades are "closed," to "stop" the blades, or prevent them from overlapping in an awkward manner, and similarly the user's left hand from coming into contact with the right hand, in grasping and closing the handles.

The prior "stop" means have most commonly comprised offsets in the steel blades so juxtaposed as to come into contact at the completion of the stroke. These steel "stops" are unsatisfactory in that, being non-resilient, they produce shock to the user, and in that they produce an annoying "clicking" sound in continuous use.

Another prior arrangement has been the use of spring-loaded metal pistons such as of Porzky U.S. Pat. No. 3,262,202. These have not met the economy and dependability requirements of commercial practise, due to their relatively high cost of manufacture, relatively high risk of failure in extensive use, and unpleasantly noisy operation.

In the prior practise the "stop" means have also comprised resilient bumpers, such as that of Hart U.S. Pat. No. 2,373,757. The prior resilient bumper stops have also been deficient, in that, as with Hart, the bumpers have engaged against round or other non-flat surfaces, or have otherwise undergone excessive deformation, such as occasioning their too rapid wear in continuous use, and the resulting, unwanted metal-to-metal contact.

Thus it is desirable to provide "stop" means that reduce the impact shock, that lower the noise level, and that remain effective under continuous use.

SUMMARY OF THE INVENTION

In the herein disclosed preferred embodiment of the invention, a hedge shears is provided with the combination of: a plurality of slide preventing, work holding notches securing and easing the cutting action by firm engaging of limbs of various diameter in position for the shearing stroke; a tension controlling device that accomplishes firm but smooth blade contact without requiring tight pivot, and with which, therefore, the blade pitch is not nearly as critical as with any other method; and a stop means employing a resilient bumper and presenting a stop having a flat surface, and which is arranged for compression only of the bumper, whereby the bumper does not excessively deform, and there is practically no wear in use.

More particularly: the holding notches are formed with flarent sides that form acute, and preferably equal, angles with the cutting blade. A bevel is formed on the engaging face of the holding blade to quiet the action by preventing direct contact of the corners of the holding notches with the cutting blade.

The tension controlling device comprises an elongated metal strip medially apertured for reception on the blade pivot, and adapted for shifting axially of the pivot bolt. The strip is formed as a tensioning spring by down-turning of its opposite arms to biasing engagement with the holding blade, one to the rear or handle side of the pivot, and the other or forward arm at an appreciable distance from the pivot, and without modification of the blade thereat.

The stop means comprise a pair of L-shaped rigid members secured to the handle portions of the blades as by rivets inserted through attaching portions thereof, and which members also have mounting portions disposed in transverse, facing relationship.

A resilient bumper is secured as by an axial screw to one of the mounting portions, and normal to the facing mounting portion, so as to be subjected only to direct or axial compression, upon impacting said facing mounting portion at the end of a cutting stroke.

The objects, advantages, features and operation of the invention shears will be clear from the foregoing and following description taken with the accompanying drawings wherein:

FIG. 1 is a plan view of an open hedge shear in accordance with the preferred embodiment.

FIG. 2 is a side elevation of the FIG. 1 shears shown in closed position.

DESCRIPTION OF THE PREFERRED EMBODIMENT

Figure 3:
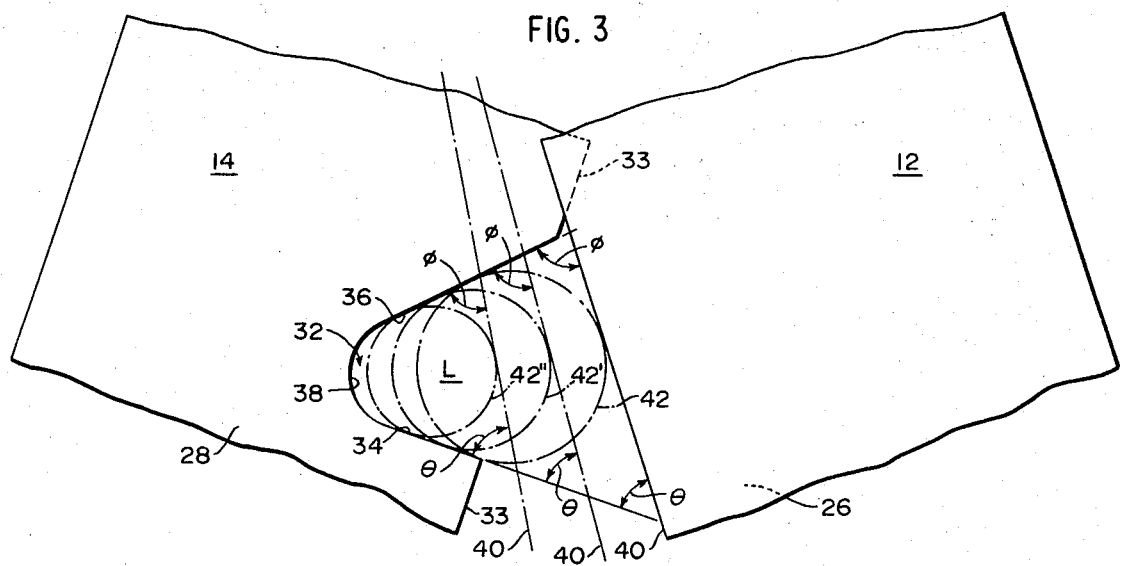
FIG. 3 is a fragmentary plan view of the shear blades showing their work holding and cutting action.

With reference to the drawings, and initially to FIGS 1 and 2, in which like reference numerals denote corresponding elements in the several views, a hedge shears 10 has two elongated blades, namely, a shearing blade 12 and a holding blade 14, with rearwardly extending handle portions 16 and 18, respectively, to which appropriate handles 20 and 22 are secured. The blades 12 and 14 are suitably apertured to receive a pivot bolt 24 about which the blades may be manually swung in overlapping relationship over their opposed flat engaging faces 26 and 28 by the handles 20 and 22 for cutting in a shearing plane, indicated at 30.

At least one, and preferably a plurality, of holding notches 32 are formed in the work engaging edge 33 of the holding blade 14, which notches are shown in FIG. 3 as being defined by two generally straight flarent or divergent sides 34 and 36 and a rounded or radiused bottom 38. The sides 34, 36 are seen as tangent to the bottom radius, with the back of the notch, or the side 34 furtherest from the pivot 24, substantially perpendicular to the work engaging edge 33, while the front side 36 nearest the pivot 24 forms an acute angle, which may be an approximate 45° angle, with said edge 33.

The work holding notches 32 further comprise vertical work engaging faces 39 comprehending the sides 34, 36 and bottom 38 and extending for the full thickness of the holding blade 14 thereat.

This described formation of their sides, bottoms, and faces provides wedging holding notches 32 in which limbs, twigs, and the like of various diameters may be securely held in abutting relationship to the cutting blade. As shown in FIG. 3, when the cutting edge 40 of the shearing blade 12 passes over the notch 32, the sides 34 and 36 form acute angles $\theta$ and $\phi$ respectively, with the cutting edge 40. This construction enables the notches 32 to cooperate with the cutting edge 40 by presenting converging bearing surfaces against which limbs L of various diameters, as represented by dotted circles 42, 42' and 42'', may be pressed at two points by the sweeping action of the shearing blade 12. Since the sides 34 and 36 and the bottom 38 are disposed substantially perpendicular to the shearing plane of the tool 10, the limbs L are firmly held against the faces 39 in position normal to the shear plane 30 to assure a clean cut with a minimum of force. As shown, the optimum holding capability is provided with notches 32 wherein the angles $\theta$ and $\phi$ are equal so that the limbs have no tendency to rotate about their axis during cutting.

It will be apparent that the outer, perpendicular notch sides 34 are also disposed substantially normal to the outward direction of movement imparted to the work by the wedging or closing action of the shear blades 12, 14, whereby the notches 32 function effectively to hold the work, as that is induced by said blade closing to slide down the sloping or acutely angled inner sides 36 to fully seat in the notches.

Accordingly, with the invention notch shape, when the opposing or shearing blade 12 is closed to cutting position, the entire opening of the notch 32 is generally closed, and the work is completely or substantially enclosed or encompassed therein, preventing both flattening and slippage. In making the work rigid by notch confinement it is made easier to cut, as against holding by flattening the work which makes it harder to cut. And in preempting slippage, the notches hold the work in firm position while making the cut.

By its firm holding of the work to be cut, and complete surrounding and encompassing of that upon the closing together of the two blades, the invention notch design is found to work better even when the cutting edge of the shearing blade has become dulled with use.

Figure 4:
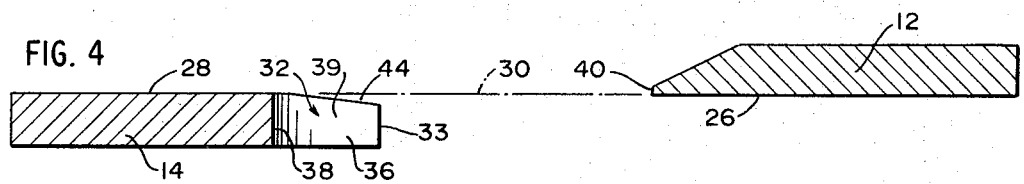
FIG. 4 is a sectional view of the holding and cutting blades taken along line 4—4 of FIG. 1.
Figure 5:
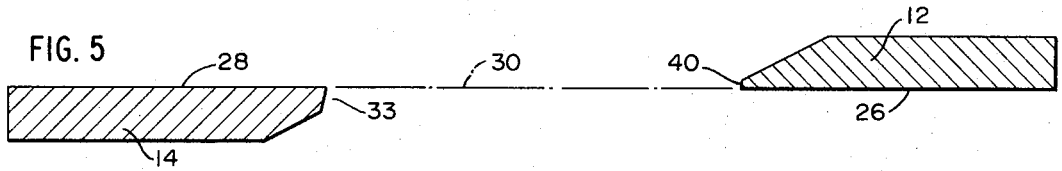
FIG. 5 is a sectional view of the blades taken along line 5—5 of FIG. 1.

To prevent damage to the shearing blade 12 by contact with the corners of the holding notches 32 and to afford quiet and smooth operation, the corners are knocked down, herein by a bevel 44, FIGS. 1 and 4, formed in the engaging face 28 of, and from the work engaging edge 33 of, the holding blade 14, said bevel extending longitudinally of and generally over the depth of the notches 32.

In accordance with the invention, the work or limb holding surfaces 39 of the notches 32 are not only square or perpendicular to the shear plane 30, but are also of a width or thickness which is adequate or sufficient to present the desired bearing or holding surface longitudinally of the work, and to secure the same against the unwanted rotating, or skewing or rocking about, during the course of the shearing manipulation of the blades, and whereby to afford the hedge shear hereof clean cutting of one or a plurality of limbs of one or a plurality of sizes.

Under this invention, then, the holding blade 12, which by its notches 32 prevents slippage away from the pivot, and holds the work firmly and vertically during the cut, is not sharpened in the region of the notches 32. The top blade 12 only is sharpened, and the cutting action obtained is that of a slicing action by one blade—i.e. a cut from one side only. For the desired firm, secure holding action, then, the transverse dimension or thickness of the holding blade 14 may be, at the base or roots of the notches 32, at least about five thirty-seconds inch, which thickness may be reduced by the bevel 44 to a thickness at the blade edge 33 of at least about four thirty-seconds or one-eighth inch.

Turning now to the shearing blade 12, that has a double bevel, comprising a long bevel 42 applied first at about 30° from the horizontal, until the cutting edge 40 is about a 0.030 inch edge or land that is then ground or sharpened, at say 45°, down to a sharp point. The bottom or engaging face 26 of the shearing blade 12 is then flat ground to straighten out the steel, and remove scale formation, and imperfections from rolling, tempering or other fabricating steps.

Further in accordance with the invention, the shears are pitched, the bottom or holding blade 14 having an upward bow of 0.030–0.040 inch, and the top or shearing blade 12 having a downward bow of 0.080–0.100 inch. This can be varied, of course, to put more or less of the combined pitch in one blade.

Under this invention there is provided also, in combination with shear blades of the described or other construction, an improved tension controlling device. The tension controlling means hereof is seen as mounted on the blade pivot, which is seen in turn to comprise a case hardened machine bolt 24, and an adjustable nut 25 retaining the blades 12, 14 which are relatively rotatable thereon.

It will be understood that to get the proper cutting action, the shears must have tension in addition to that afforded by the pitch of the blades. Accordingly, with reference to FIG. 2, an elongated metal strip spring 46, preferably of tempered steel, has an oversized opening at a medial point receiving and by which it is loosely held on the pivot bolt 24, being pressed under the head of, and at a spacing from the blade 12 afforded by the projecting shank of, said bolt 24.

The strip spring 46 has forward and rearward arms 47, 51 projecting oppositely of its medial pivot mounting, and turned downwardly at both ends to an engagement with the facing, herein upper blade 12 such that, with the nut 25 adjusted as normally, the spring 46 is compressed between the bolt head and blade 12, and thereby functions to bias or tension the top blade 12 against bottom blade 14.

The forward arm 47 of the strip spring 46 mounts or terminates in an inwardly extending or inturned member or portion, herein an integral lip 48, engaging against outer face 50 of the shearing blade 12 at a suitable distance from, which may be about 3 inches forward of, the pivot 24, whereby is afforded it a lever action, or a large mechanical advantage, at the spaced away point, over merely tightening the pivot bolt.

It is found that there is a proper relationship, of in excess of a 1:1 ratio, of the length of tensioning arm 47 to the spacing up from the adjacent blade of the spring strip portion engaging under the head of the pivot bolt 24.

Under the invention the forward lever arm 47 of strip spring 46 is tapered, and also slightly angled from proximate the pivot out to the turned down, rounded point 48, as shown, FIGS. 1 and 2, and whereby it is afforded less weight, better appearance, sufficient tension, and wanted precise application of the tension at the center or towards the cutting edge of the shear blade 12.

It will be seen also that the strip spring 46 may be adjusted in tension by opening or closing the nut 25, with the desired firm but yielding or spring pressure being asserted against the blades by the lip or point 48 at the optimum point to insure proper shearing action along the entire length of the blades.

Thus the unnotched, outer extremity of the blade 14, which, as earlier mentioned, may be, say 3½ inches in length and pitched for cutting fine material such as grass, is assured of the desired sharp cutting action with respect to such lighter, fine material.

The rear arm 51 of the strip spring 46 is seen as shorter and wider than forward arm 47, being of untapered, full strip width, and therefore of stiffer section. Rear arm 51 extends a straight or horizontal length approximating that of forward arm 47 to its aforementioned incline or bend. At the end of its straight length away from the pivot, rear arm 51 is curved or turned down against blade 12, and there provided with a narrow nib or lip 52 projecting further down into cooperating recess or aperture 54 provided in blade 12 thereat.

From FIG. 2 it will be seen that forward arm 47 is of a length B more than twice the length A of rearward arm 51, and such that its engagement by lip 48 against upper blade 12 is at a point intermediate the length of blade 14 that is recessed by the notches 32.

Further in accordance with the invention, the spring 46 is provided in its longer, tapered, forward arm 47, at the point outwardly of but relatively close to the pivot where commences the aforementioned taper and incline of the arm, with an elongated, tear drop hole 54, which is seen to taper outwardly from said incline or bend of the arm; which is of good appearance; which provides a means for hanging the shears from a nail or the like; which controls the lever arm at the right tension for the weight of the material used; and which defined two flexible struts at the weakest or maximum flexure point.

As understood by those skilled in the art, if the tension were to be applied at the pivot, as by closing the bolt and nut 24, 25 against the pitched blades, that would cause binding at the heel of the blades, rapid wear of the blades, a too tight pivot, and impairment of the cutting action. With the described tension device 46, not only is this binding avoided, but also a loose pivot is achieved, for easy action, and to permit the upper blade to in effect ride up the shank of the bolt responsive to the blade pitch, while the desired tension is applied at the point of the cut. There results a uniformly good cutting action, by the presence of wanted pressure out at the point of cutting, and of resilient or yielding closing pressure on the blades at the pivot, freeing the blades from the rigid binding that results from resort to excessive pitch or pivot confinement for the tensioning, and that grinds the cutting action and too rapidly wears the blades.

Under the invention the pivot arrangement may be as shown, FIGS. 1 and 2, or the bolt 24 may be passed through the blades 12, 14 from the bottom, having a rigid relation either with the top blade 12 by a press fit with spring 46, or with the bottom blade 14 by a press fit of its smooth shoulder with the bottom blade. There results a rigid blade and bolt pivot for the other blade to turn on, and the ability to make the tension adjustment with but a single tool. The described arrangement is also the most economical, eliminating as it does the threading of the blade openings, and the need for a more expensive carriage type bolt, or for welding or riveting. Further, the pivot hereof is replaceable, as a riveted or welded bolt would not be.

Figure 6:
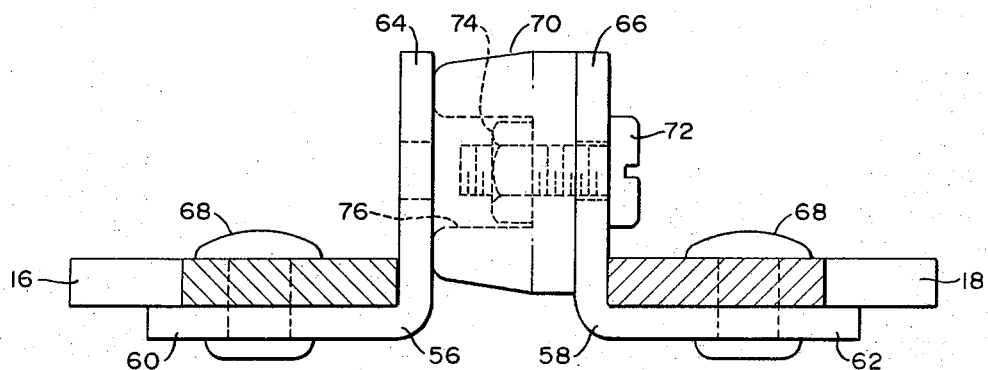
FIG. 6 is a view of the blade stop means taken along line 6—6 of FIG. 1.

Referring now to FIGS. 1, 2 and 6, to cushion shock between the blades 12 and 14 at the end of the shearing stroke, a pair of L-shaped members or angle brackets 56 and 58, each defining a mounting plate or arm 60 and 62 and a facing plate or arm 64 and 66, are secured to the handle mounting portions 16 and 18, respectively, as by rivets 68. The facing arms or stop plates 64 and 66 are seen as turned upwardly over the facing edges of the juxtaposed blade portions 16 and 18, in spaced parallelism and substantially perpendicular to the shearing plane 30. An exposed frusta-conical resilient or rubber bumper or button 70 is secured by an axial screw, rivet or the like 72 passed through it and one of the plates, herein the plate 66, the screw receiving a threaded nut 74 recessed with it in a well 76 eliminating metal-to-metal contact between the securing means and the opposing flat or stop plate 64, and proportioned, relative to the bumper 72, to define the projecting, frusto-conical portion of the bumper or button as a compressive annulus of sufficiently large cross section to attain the wanted compressive strength and shock absorption, with substantial freedom from deformation and wear in continuous use, in a low durometer or soft rubber construction.

The parallel relationship between the facing stop plates 64 and 66 insures that the bumper 70 is subjected to direct axial compression, by the closing of the blades to completion of the cutting stroke, eliminating non-axial deformation of the bumper, and thereby greatly increasing its durability in use. It should be apparent that other axially symmetrical bumpers, such as cylindrical, may also be employed.

It is understood that this description is solely for illustration and that the invention contemplates numerous modifications and equivalents which fall within the spirit and scope of the appended claims.

We claim:
1. In hedge shears, in combination,
   a pair of pitched blades pivotally joined for swinging their engaged faces in a cutting place, one said blade comprising
   an elongated shearing blade having a generally flat engaging face and a cutting edge, the other said blade comprising
   an elongated holding blade having a generally flat engaging face and a working edge recessed by a plurality of work holding notches, each of said notches having
   a rounded bottom, generally straight sides diverging from said bottom to define at said working edge an opening to receive work up to the desired size, and a work engaging wall extending continuously of said bottom and sides and substantially perpendicular to said cutting plane, said holding blade and thereby said notches of sufficient thickness for firm seating of the work against said work engaging walls, the inclination of the inner of said notch side walls being towards said bearing means, and the inclination of the outer of said notch side walls being substantially normal to said working edge, the inclination of said notch side walls being thereby at an acute angle to said shearing blade cutting edge when closed over said notches, whereby upon closing together of said holding and shearing blades the work is wedged toward the bottom of and thereby vertically held in said notched, enabling the desired slicing of the work by said shearing blade without rotation of its said vertical seating in said holding blade;

a bevel formed on said engaging face of and at said working edge of said holding blade, said bevel extending longitudinally over the region of said notches whereby said working edge of said holding blade and said work engaging walls of said notches clear said cutting edge of said shearing blade in and whereby to quiet said closing together of said holding and said shearing blades; bearing means on which the blades are received for relative movement both in rotation about and in opening-closing along the axis of their pivoting, said bearing means located at a point intermediate in the pitched extent of said blades;

spring means received on said bearing means and compressed in said pivoting axis between said bearing means and one of, and so as to bias that against the other of, said pitched blades, the pitching of said blades, and their biasing by said spring means being such as to properly tension the blades for effective cutting at all points along the blade length, and with yielding by said spring means to opening of said blades on said bearing means upon the closing together of said blades to engagement with the work towards the tips of the blades; and resilient stop means carried by and arranged to halt the closing together of said shear blades upon the completion of the cutting stroke.

2. A hedge shears according to claim 1, wherein said spring means comprises:

a metal strip loose on said bearing means, formed to engage one said blade at points spaced from said bearing means, and compressed between said one blade and said bearing means.

3. A hedge shears according to claim 1, wherein said resilient stop means comprise:

a rigid stop carried on one said blade;

a rigid support carried on the other said blade and in juxtaposition to said stop; and a resilient bumper mounted on said support to project towards said stop and whereby closing manipulation of said blades to engage said tips subjects said bumper to direct axial compression.

4. A hedge shears according to claim 3, wherein said stop and support comprise angle brackets having their one arms fixed to the blades and their other arms parallel-extending from the facing edges of said blades.

5. A hedge shears according to claim 3, wherein said resilient bumper comprises a solid rubber button, and means recessed in said button for releasably securing that to said support.

* * * * *